(12) United States Patent
Goujon et al.

(10) Patent No.: US 8,136,383 B2
(45) Date of Patent: Mar. 20, 2012

(54) CALIBRATING AN ACCELEROMETER

(75) Inventors: Nicolas Goujon, Oslo (NO); Ahmet Kemal Ozdemir, Asker (NO); Bent Andreas Kjellesvig, Rasta (NO)

(73) Assignee: WesternGeco L.L.C., Houston, TX (US)

( * ) Notice: Subject to any disclaimer, the term of this patent is extended or adjusted under 35 U.S.C. 154(b) by 763 days.

(21) Appl. No.: 12/193,028

(22) Filed: Aug. 17, 2008

(65) Prior Publication Data
US 2009/0056411 A1    Mar. 5, 2009

Related U.S. Application Data

(60) Provisional application No. 60/968,496, filed on Aug. 28, 2007.

(51) Int. Cl.
*G01P 21/00* (2006.01)
(52) U.S. Cl. .......................... 73/1.38; 702/104
(58) Field of Classification Search ................ 73/1.38; 702/104
See application file for complete search history.

(56) References Cited

U.S. PATENT DOCUMENTS

| | | | |
|---|---|---|---|
| 4,300,220 A | 11/1981 | Goff et al. | |
| 4,520,467 A * | 5/1985 | Berni | 367/24 |
| 5,049,795 A | 9/1991 | Moulds, III | |
| 5,479,161 A | 12/1995 | Keyes et al. | |
| 5,621,699 A * | 4/1997 | Rigsby et al. | 367/22 |
| 5,852,242 A | 12/1998 | Devolk et al. | |
| 6,023,960 A | 2/2000 | Abrams et al. | |
| 6,035,694 A | 3/2000 | Dupuie et al. | |
| 6,101,864 A | 8/2000 | Abrams et al. | |
| 6,301,195 B1 | 10/2001 | Faber | |
| 6,353,577 B1 | 3/2002 | Orban et al. | |
| 6,430,105 B1 | 8/2002 | Stephen | |
| 6,512,980 B1 * | 1/2003 | Barr | 702/1 |
| 6,671,223 B2 | 12/2003 | Bittleston | |
| 6,684,160 B1 * | 1/2004 | Ozbek et al. | 702/17 |
| 6,725,164 B1 | 4/2004 | Bednar | |
| 6,758,080 B1 | 7/2004 | Ragan et al. | |
| 6,814,179 B2 | 11/2004 | Corrigan et al. | |
| 6,861,587 B1 | 3/2005 | SelVakumar et al. | |
| 6,871,544 B1 | 3/2005 | Selvakumar et al. | |
| 6,883,638 B1 | 4/2005 | Maxwell et al. | |
| 6,945,110 B2 | 9/2005 | Selvakumar et al. | |
| 7,012,853 B2 | 3/2006 | Iseli et al. | |
| 7,232,701 B2 | 6/2007 | Gogoi et al. | |
| 7,236,279 B2 | 6/2007 | Yu et al. | |
| 7,273,762 B2 | 9/2007 | Gogoi | |
| 7,274,079 B2 | 9/2007 | Selvakumar et al. | |

(Continued)

FOREIGN PATENT DOCUMENTS

EP    1 192 419 B1    4/2007

(Continued)

OTHER PUBLICATIONS

International Search Report, dated Dec. 4, 2008, for PCT/US2008/074230, and written opinion therefore also mailed Dec. 4, 2008.

(Continued)

*Primary Examiner* — Thomas P Noland

(57) ABSTRACT

To calibrate an accelerometer, a seismic cable that carries the accelerometer is rotated. Data measured by the accelerometer as the seismic cable is rotated is received, and at least one calibration parameter according to the received data is computed. The at least one calibration parameter is for use in calibrating the accelerometer.

20 Claims, 6 Drawing Sheets

U.S. PATENT DOCUMENTS

| | | | |
|---|---|---|---|
| 7,292,504 B2 | 11/2007 | Luc | |
| 7,379,386 B2 | 5/2008 | Muyzert et al. | |
| 7,729,202 B2 | 6/2010 | Eperjesi et al. | |
| 7,734,838 B2 | 6/2010 | Pavel et al. | |
| 2003/0088372 A1 | 5/2003 | Caulfield | |
| 2004/0073373 A1* | 4/2004 | Wilson | 702/16 |
| 2005/0119831 A1* | 6/2005 | Ferber | 702/14 |
| 2007/0286023 A1 | 12/2007 | Bull et al. | |
| 2008/0021658 A1 | 1/2008 | Pavel et al. | |
| 2008/0062815 A1 | 3/2008 | Iseli | |
| 2008/0275649 A1 | 11/2008 | Ozdemir et al. | |
| 2008/0316859 A1 | 12/2008 | Welker et al. | |
| 2009/0022009 A1 | 1/2009 | Ozdemir et al. | |
| 2010/0002541 A1 | 1/2010 | Ozdemir et al. | |
| 2010/0116054 A1 | 5/2010 | Paulson | |

FOREIGN PATENT DOCUMENTS

| | | | |
|---|---|---|---|
| GB | 2 086 055 A | 5/1982 | |

OTHER PUBLICATIONS

R.D. Kinney, Sr. "Characterization of a MEMS Accelerometer for Inertial Navigating Applications", Sandia National Laboratories, Albuquerque, NM, Feb. 12, 1999, 12 pages.

Jianxin Yuan et al., "Orientation of Non-Gimballed Three-Component Geophones in Sea-Floor Data", EAGE 59th Conference and Technical Exhibition—Geneva, Switzerland, May 26-30, 1997—Geophysical Division, 2 pages.

Mark A. Lemkin et al., "A 3-Axis Force Balanced Accelerometer Using a Single Proof-Mass", IEEE, Transducers '97, International Conference on Solid-State Sensors and Actuators, Chicago, Jun. 16-19, 1997, pp. 1185-1188.

Mark Paul Lubratt, A Voltage-Tunable Microfabricated Accelerometer, Massachusetts Institute of Technology, Sep. 16, 1991, pp. 1-163, Master's Thesis.

* cited by examiner

CALIBRATING AN ACCELEROMETER

CROSS-REFERENCE TO RELATED APPLICATION

This claims the benefit under 35 U.S.C. §119(e) to U.S. Provisional Application Ser. No. 60/968,496, filed Aug. 28, 2007, which is hereby incorporated by reference.

TECHNICAL FIELD

The invention relates generally to calibrating an accelerometer, such as an accelerometer used in a seismic sensor for a marine surveying application.

BACKGROUND

Seismic surveying is used for identifying subterranean elements, such as hydrocarbon reservoirs, fresh water aquifers, gas injection reservoirs, and so forth. In performing seismic surveying, seismic sources can be placed above a surface under which is located a subterranean structure. One type of seismic surveying is marine seismic surveying, in which seismic sensors can be towed in a body of water or placed on a sea floor above the subterranean structure.

Seismic sensors are typically calibrated by a manufacturer of the seismic sensors prior to delivering such seismic sensors to customers. However, after some amount of use in the field, the sensitivity of seismic sensors can change over time. Some conventional techniques exist to check for sensitivity of seismic sensors in the field for determining whether such seismic sensors exhibit seriously degraded performance. However, such conventional techniques suffer from lack of accuracy. Moreover, conventional sensitivity checking techniques provide relative, not absolute, sensitivity values of seismic sensors, in which a sensitivity of one seismic sensor is relative to the sensitivity of another seismic sensor. To perform proper recalibration of seismic sensors, operators typically have to send the seismic sensors back to the manufacturer, which is costly and time-consuming.

SUMMARY

In general, according to an embodiment, a method of calibrating an accelerometer includes rotating a carrier structure that carries the accelerometer, and receiving signals measured by the accelerometer as the carrier structure is rotated. At least one calibration parameter is computed according to the received signals, where the at least one calibration parameter is for use in calibrating the accelerometer.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
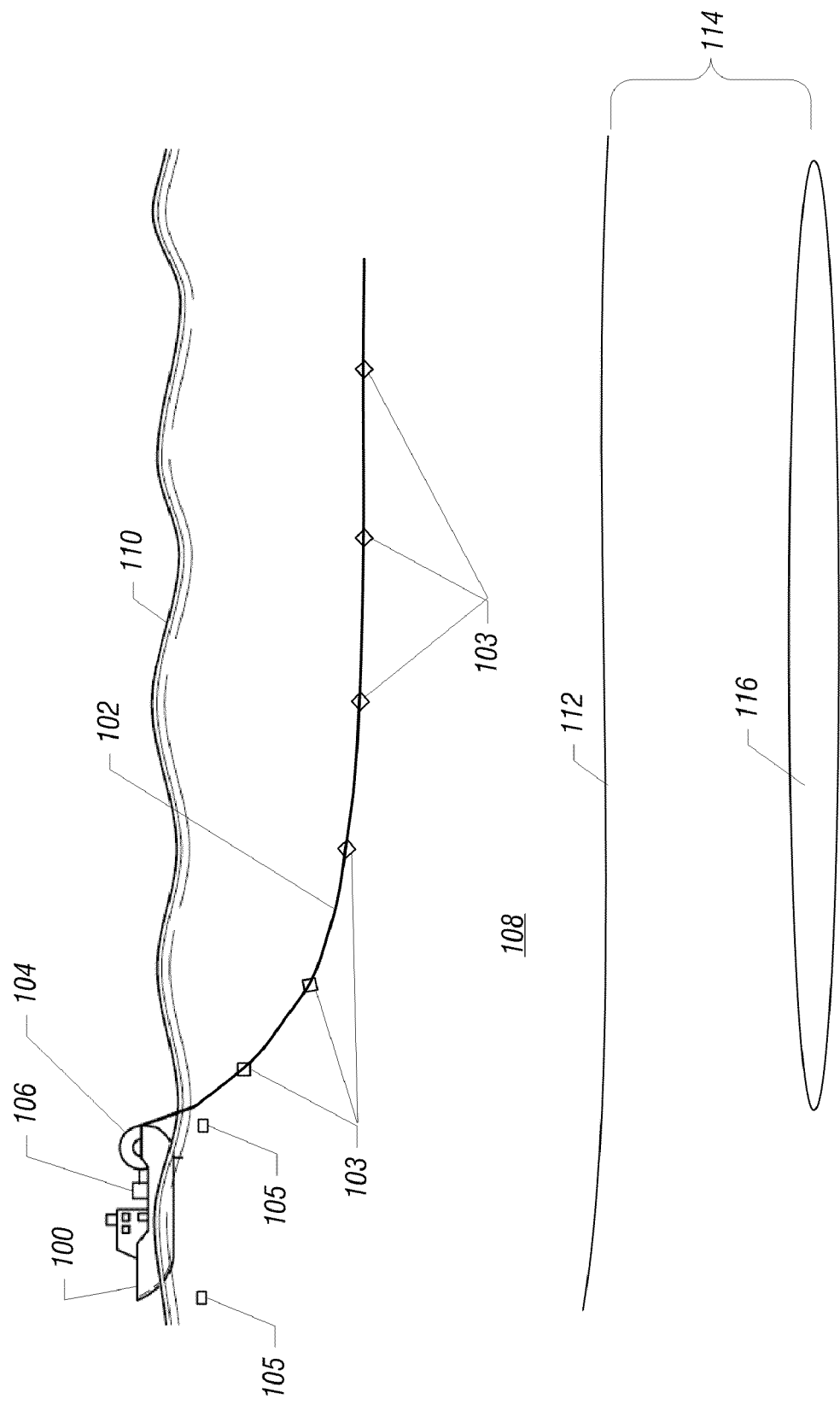
FIG. 1 illustrates a streamer including seismic sensors including accelerometers that are towed in a body of water by a sea vessel, according to an example embodiment.

FIG. 1 illustrates a sea vessel 100 that has a reel or spool 104 for deploying a streamer 102 (or multiple streamers 102), where the streamer 102 is a cable-like carrier structure that carries a number of electronic devices 103 for performing a subterranean survey of a subterranean structure 114 below a sea floor 112. In the following, the term "streamer" is intended to cover either a streamer that is towed by a sea vessel or a sea bed cable laid on the sea floor 112. More generally, a carrier structure deployed in the field for carrying electronic devices for performing a seismic survey operation is referred to as a "seismic cable."

The electronic devices 103 can include sensors, steering or navigation devices, air gun controllers (or other signal source controllers), positioning devices, and so forth. Also depicted in FIG. 1 are a number of signal sources 105 that produce signals propagated into the body of water 108 and into the subterranean structure 114. The signals are reflected from layers in the subterranean structure 114, including a resistive body 116 that can be any one of a hydrocarbon-containing reservoir, a fresh water aquifer, a gas injection zone, and so forth. Signals reflected from the resistive body 116 are propagated upwardly toward the sensors of the streamer 102 for detection by the sensors. Measurement data is collected by the sensors, which can store the measurement data and/or transmit the measurement data back to a control system (or controller) 106 on the sea vessel 100.

Although the sources 105 are depicted as being separate from the streamer 102, the sources 105 can also be part of the streamer 102 in a different implementation.

The sensors of the streamer 102 can be seismic sensors, such as hydrophones and/or geophones. Also, the sensors can include inclinometers. The signal sources 105 can be seismic sources, such as air guns or explosives. In some implementations, the geophones can be provided on the streamer 102 along with hydrophones, which are instruments for measuring sound received through water. Providing geophones in addition to hydrophones can be beneficial for various reasons, such as for deghosting and other applications. Note, however, in other implementations, hydrophones do not have to be employed on the streamer 102.

Figure 2:
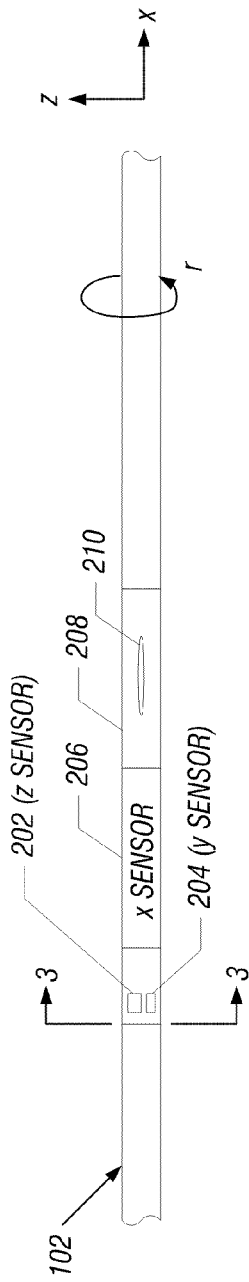
FIG. 2 is a side schematic view of a portion of the streamer of FIG. 1.

FIG. 2 shows a side view of a portion of the streamer 102, where the portion includes sensors 202, 204, and 206, as well as a steering device 208. The steering device 208 can include control surfaces 210 (in the form of blades or wings) that are rotatable about a longitudinal axis (x axis) of the streamer 102 to help steer the streamer 102 in a desired lateral direction in the body of water 108. The steering device 208 can be provided every few intervals along the streamer 102.

The sensors 202 and 204 can be geophones, and the sensor 206 can be an inclinometer. In some embodiments, each of the geophones 202 and 204 and inclinometer 206 can be implemented with accelerometers, where an accelerometer is an instrument for measuring acceleration such that vibrations can be detected and measured (e.g., as vibrations due to reflected signals from the subterranean structure 114 due to seismic source signals produced by the seismic sources 105). In one specific example, an accelerometer can include a microelectromechanical systems (MEMS) sensor, which is a sensor made using microelectronics in combination with micromachining technology. An MEMS sensor has a generally flat amplitude response versus frequency, down to DC. In other implementations, other types of accelerometers can be used.

In some embodiments, each accelerometer can record a component of a gravity field (expressed in terms of a g unit) along an axis of the accelerometer. Thus, in the example of FIG. 2, the sensor 202 (z sensor) has an axis along the z axis, the sensor 204 (y sensor) has an axis along a y axis (which is perpendicular to the page of the drawing of FIG. 2, also depicted in FIG. 3), and the sensor 206 (x sensor) has an axis along the x axis. The x axis extends generally along the longitudinal axis of the streamer 102, while the y and z axes are in a plane that is perpendicular to the x axis.

In some implementations, the z sensor and y sensor are used to detect seismic signals reflected from the subterranean structure, whereas the inclinometer implemented with the x sensor is used to detect an inclination of the streamer 102 with respect to the x axis.

In certain applications, it is desirable to measure the vertical component (along the z axis) of acceleration (or velocity). To be able to determine such vertical component, the orientations of the accelerometers on the streamer 102 are determined. To do so, two accelerometers (202, 204) can be mounted orthogonally in a plane perpendicular to the streamer axis (x). This plane is defined by the z and y axes. Based on the signals from the orthogonally-mounted accelerometers, the orientations of the accelerometers can be determined such that measurement data from these accelerometers can be rotated according to the orientations of the accelerometers. In another example implementation, instead of using two orthogonally mounted accelerometers, a gimbal mechanism can be used to orient an accelerometer on the streamer 102.

The streamer 102 is rotatable (with the help of the steering devices 208) about the longitudinal axis (x) in a rotational direction indicated by r in FIG. 2. In accordance with some embodiments, a calibration technique is used for calibrating one or more accelerometers along the streamer 102 based on signals acquired during rotation of the streamer 102. As the streamer 102 is rotated 360°, the component of gravity seen by an accelerometer can vary between +1 g and −1 g. A recorded signal corresponding to +1 g represents a maximum amplitude value recorded by the accelerometer, whereas a signal corresponding to −1 g represents a minimum amplitude value recorded by the accelerometer. The signals measured by the accelerometer can be voltage signals with corresponding voltage values (maximum voltage value to correspond to +1 g, and minimum voltage value to correspond to −1 g).

Note also that active steering (such as with the steering devices 208) does not have to be provided to perform the calibration technique according to some embodiments. As a streamer is towed in a body of water, it will rotate over time, such as a result of varying tension in the streamer. The rotation of the streamer depends on the speed of the sea vessel and sea currents. The streamer angle will also change from deployment to deployment. By monitoring the accelerometer values over time, it is possible to find the maximum and minimum amplitude values corresponding to +1 g and −1 g as discussed.

Based on the measured signals produced by an accelerometer on the streamer 102 during rotation of the streamer 102, calibration parameters associated with the accelerometer can be calculated, where the calibration parameters are used for calibrating the accelerometer. Calibrating the accelerometer using the calibration parameters refers to applying the calibration parameters to measurement data from the accelerometer to compensate for known errors of the accelerometer. As discussed in further detail below, the calibration parameters that are computed based on signals received from an accelerometer during rotation of the streamer 102 include a sensitivity of the accelerometer and an offset of the accelerometer.

Moreover, note that the streamer is stored on a reel 104 on the vessel. The reel when unwinding can be used to cause rotation of the accelerometer (as the accelerometer is rotated with the reel as the reel is unwinding). This can be used mainly to calibrate the x sensor 206, although calibration of the DC offset of the y and z sensors can be performed using this technique.

Signals recorded by an accelerometer can be classified into three categories. A first category includes the component of gravity recorded along the axis of the accelerometer, arcsin $(\phi)*g$, $\phi$ being the angle of the accelerometer axis with respect to horizontal. The component of gravity will be +1 g or −1 g when the accelerometer is vertical (the axis of the accelerometer is along the z direction) and 0 g when the accelerometer is horizontal (the axis of the accelerometer is in the y or x direction).

A second category of signals that can be recorded by an accelerometer includes noise, which can be acoustic, waterborne noise or streamer vibration noise. The root-mean-square (RMS) noise level of an accelerometer is usually in a range from a few milli-g's (mg) to a few tens of mg in the worst case.

A third category of signals that can be recorded by an accelerometer includes a seismic signal, which refers to seismic energy resulting from a signal produced by the seismic source. The amplitude of a seismic signal can reach a few hundred mg for the first pulse arrival at a sensor located close to the seismic source, and decay to a few mg or less with time and offset from the seismic source.

Figure 3:
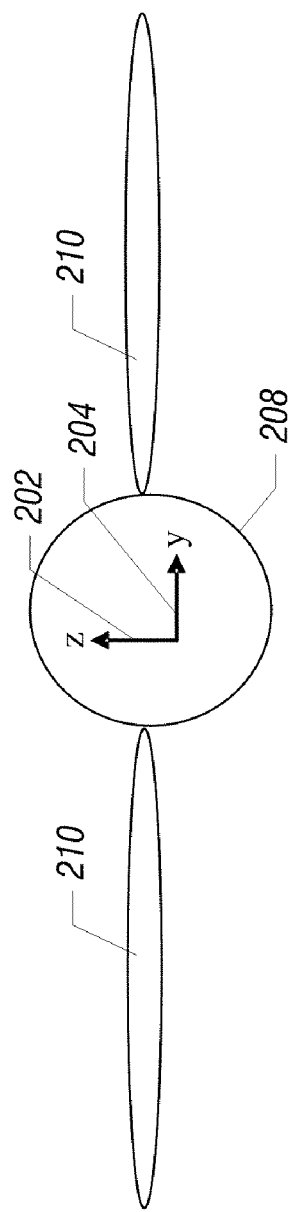
FIG. 3 is a cross-sectional view of the streamer of FIG. 1, including a schematic representation of seismic sensors provided in the streamer.
Figure 4:
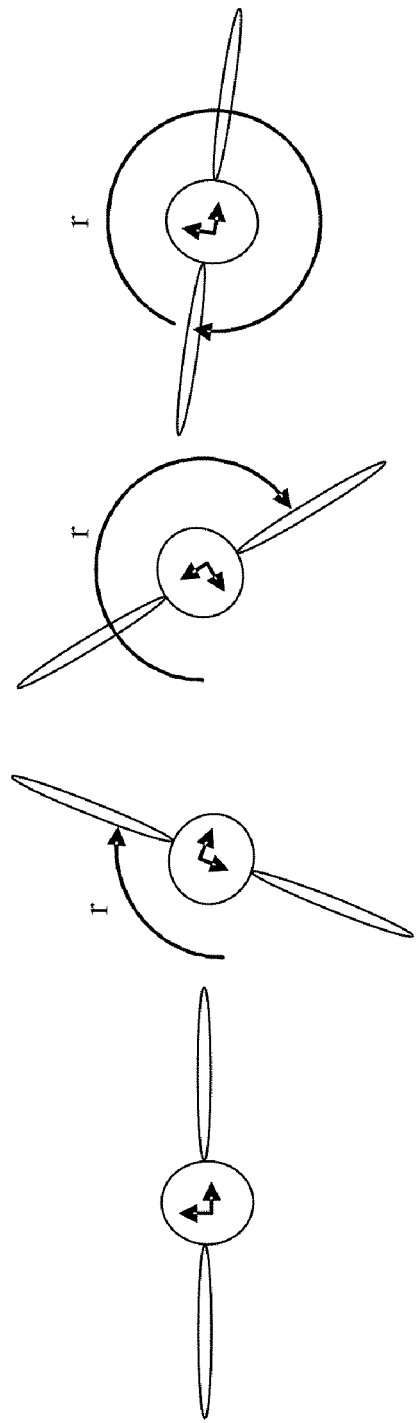
FIG. 4 illustrates rotation of the streamer about the longitudinal axis.

A cross-sectional view of the streamer along section 3-3 in FIG. 2 is depicted in FIG. 3, which shows the wings 210 of the steering device 208. Accelerometers 202 and 204 are schematically represented by arrows pointing in the z axis and y axis, respectively. As depicted in FIG. 4, the streamer can be rotated along a rotational direction represented as r.

Figure 5:
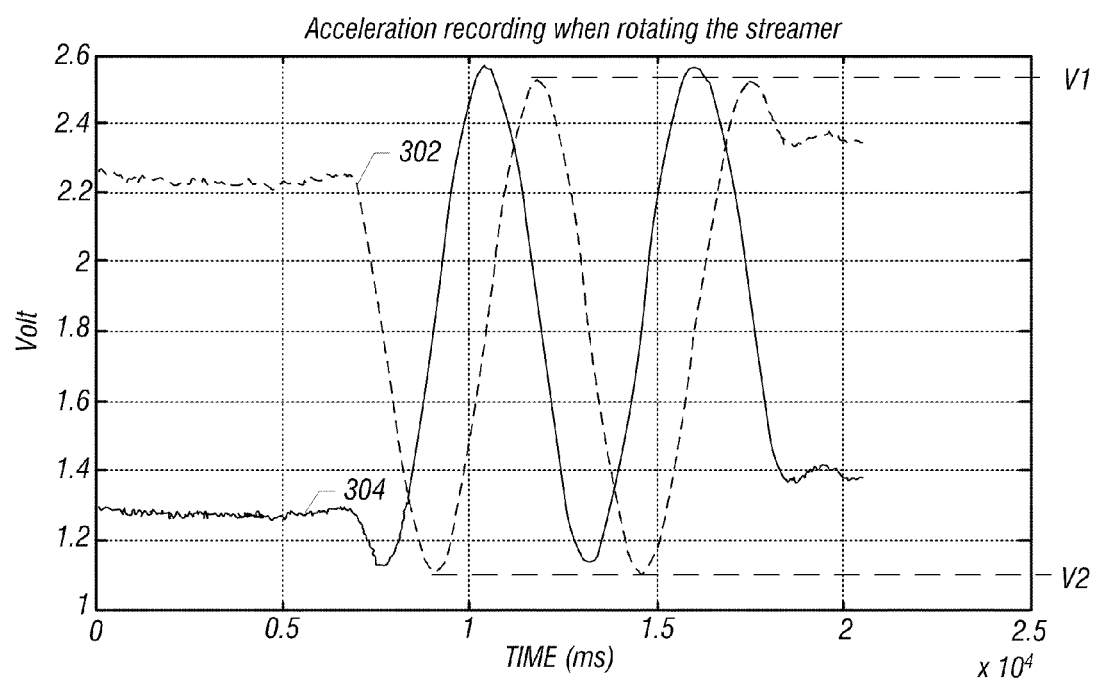
FIG. 5 is a graph that plots voltage values corresponding to acceleration recorded by seismic sensors over time, where the voltage values can be used for computing calibration parameters, according to an embodiment.

FIG. 5 depicts voltage amplitudes of the z accelerometer and y accelerometer as a function of time during which the streamer 102 is rotated. A curve (dashed curve) 302 represents a voltage signal recorded by the z accelerometer, whereas a curve 304 (solid curve) represents the voltage signal recorded by the y accelerometer. Note that in the time between t=7,000 seconds and t=18,000 seconds, the streamer 102 has been rotated two times by 360°.

The maximum voltage associated with the curve 302 (representing the signal of the z accelerometer) is V1, whereas the minimum voltage of the curve 302 is V2. The voltage V1 is the amplitude of the signal recorded by the z accelerometer for a +1 g measurement, whereas the voltage V2 is the voltage measured by the z accelerometer for a −1 g measurement. The curve 304 representing the signal for the y accelerometer similarly has a maximum voltage value and a minimum voltage value that corresponds to the +1 g and −1 g measurements. Maximum voltage V1 and minimum voltage V2 corresponds to +1 g and −1 g assumes that the streamer 102 is horizontal (in other words, the length of the streamer is horizontal with respect to the x axis).

Calibration parameters, including the sensitivity (S0) and offset (Offset) can be calculated as follows:

$$S0=(V1-V2)/2, \quad \text{(Eq. 1)}$$

$$\text{Offset}=(V1+V2)/2. \quad \text{(Eq. 2)}$$

The sensitivity S0 of an accelerometer indicates the volts-per-g sensitivity of the accelerometer. The Offset parameter represents the DC offset of the accelerometer (the voltage measured by the accelerometer when the accelerometer's axis is horizontal). For an accelerometer that has a flat amplitude response versus frequency down to DC, the calibration parameters computed using the gravity field is also valid in the seismic frequency band. Also, these calibration parameters are absolute calibration parameters for each individual accelerometer, not relative calibration parameters.

The measured V1 and V2 values will be affected by the recorded noise and seismic signal (if any). The amplitude of the first arrival of seismic energy from the seismic source can be up to a few hundred mg's, and can cause a large error when measuring +1 g and −1 g. Therefore, in some embodiments, seismic sources are not activated during calibration of an accelerometer as discussed above.

Moreover, the RMS level of noise is usually a few mg. An error of up to 5 mg when measuring +1 g and −1 g (corresponding to V1 and V2, respectively) can in some cases cause an error in the sensitivity (S0) of about 0.5%, which provides relatively good calibration accuracy.

If improved calibration accuracy is desired, several options can be used. The streamer can be fully rotated several times (rotated a full 360° several times), with V1 and V2 measured in each rotation (of 360°). The various V1 and V2 values due to multiple full rotations of the streamer can be averaged to produce an average V1 and average V2 for computing the S0 and Offset values according to Eqs. 1 and 2. Averaging V1 and V2 values across multiple rotations of the streamer can reduce error in the calibration parameters.

A second option is to slowly rotate the streamer, such that most of the vibration and ambient noise can be filtered out using a high-cut filter with a corner frequency of a few hertz (Hz), which will reduce the noise level without affecting the recording of the gravity component.

If the streamer (or the portion of the streamer containing the accelerometer to be calibrated) is not perfectly horizontal along the x axis (in other words, the length of the streamer (or streamer portion) is not horizontal with respect to the x axis), the maximum gravity field seen by the z and y accelerometers will not be exactly 1 g, but can be slightly less. For example, if the streamer's slope is 3°, the accelerometer will be at 3° from vertical incidents, and a component of gravity measured (V1) is 0.9986 g, where the 0.9986 g is equal to cos(3°).

The error on the +1 g recording in the above example is thus 1−cos(3°)=1−0.9986=1.4 mg, or less than 0.15%. This is also a relatively small error (assuming 3° streamer slope).

An incline in the streamer with respect to the x axis can be corrected if an inclinometer is used, such as an inclinometer implemented with the x sensor 206 of FIG. 2. The x sensor 206 is in-line with the streamer 102. The measurement from the x sensor can be used to correct for the y and z measurements. For example, if the incline of the length of the streamer 102 is α degrees with respect to the x axis, then the measurement data recorded by the y or z accelerometer can be divided by cos(α) to obtain the correct 1 g value for the y and z measurement.

Moreover, the fact that y and z are perpendicular can also be used to help find the maximum and minimum values, as they will correspond to a 0 g recording on the other axis. Because y and z are perpendicular, it is possible to calculate what absolute DC acceleration one of the y and z accelerometers should record when the acceleration of the other is known. This can be used to perform quality control of the calibration of one axis with measurements from the other axis to help find the maximum and minimum values for one axis, as they will correspond to a 0 g recording on the other axis. Alternatively, both the y and z axes can be calibrated together by combining the measurements from the y and z accelerometers, since the relationship between the y and z measurements allow for recovery of calibration parameters for both axes from several measurements at different positions, even if they do not correspond exactly to the minimum and maximum values.

In another embodiment of the invention, the sensor calibration problem is formulated as a geometrical curve fitting problem. For instance, it is observed that the tip of the vector, whose coordinates are the DC values of the x, y and z components of the acquired measurement, will trace an ellipsoid in the three dimensional coordinate system. Hence, the problem of sensor calibration can be thought of as the problem of fitting an ellipsoid to the measurement.

For the purpose of notational simplicity, it is assumed that the cable is perfectly balanced along the x axis, and there is no cross-talk between x component and the other components. Hence, the DC portion of the other two components will lie on an ellipse at all times in the y-z plane. Algebraically, the DC portion of the particle motion components should satisfy the following equation for an ellipse in the absence of noise:

$$a_{22}(Y_i-Y_b)^2+2a_{23}(Y_i-Y_b)(Z_i-Z_b)+a_{33}(Z_i-Z_b)^2=g^2 \quad \text{(Eq 3)}$$

In this equation, $Y_i$, $Z_i$ are the DC measurement corresponding to the two components of the particle motion sensors acquired at time i; $Y_b$, $Z_b$ are the corresponding biases in the DC measurement; $a_{22}$, $a_{33}$ are scalars representing the correction on the actual sensor sensitivities; $a_{23}$ is a scalar representing the crosstalk between the components of the particle motion sensors; and g=9.8 m/s². It is to be noted that, in the absence of any bias on the DC measurement, i.e. $Y_b=Z_b=0$, the center of the ellipse is the center of the y-z plane. Furthermore, in the absence of any cross talk between individual components, i.e., y and z components are perfectly orthogonal, then $a_{23}=0$, and the major axes of the ellipse are aligned with the y, and z axes of the coordinate system.

Hence it is noted that, by estimating the parameters of an ellipse that best describes the DC portion of the measurements, the calibration values are obtained for the sensors. Expanding Eq. 3 gives us a slightly different parameterization for the curve that describes the DC measurement:

$$a_{22}Y_i^2+2a_{23}Y_iZ_i+a_{33}Z_i^2+b_2Y_i+b_3Z_i+c=0 \quad \text{(Eq. 4)}$$

where $b_2$, $b_3$ and c are functions of $a_{22}$, $a_{23}$, $a_{33}$ and g. Since the same equation should be satisfied by all measurements, the following relationship is derived:

$$\begin{bmatrix} Y_1^2 & 2Y_1Z_1 & Z_1^2 & Y_1 & Z_1 & 1 \\ Y_2^2 & 2Y_2Z_2 & Z_2^2 & Y_2 & Z_2 & 1 \\ \vdots & \vdots & \vdots & \vdots & \vdots & \vdots \\ Y_N^2 & 2Y_NZ_N & Z_N^2 & Y_N & Z_N & 1 \end{bmatrix} \begin{bmatrix} a_{22} \\ a_{23} \\ a_{33} \\ b_2 \\ b_3 \\ c \end{bmatrix} = \begin{bmatrix} 0 \\ 0 \\ \vdots \\ 0 \end{bmatrix} \Rightarrow Md = 0, \quad \text{(Eq. 5)}$$

where N is the index of the last DC measurement. Eq 4 describes a set of linear equations for the sensitivity corrections and the DC biases. Usually the number of measurements will far exceed the number of unknowns, i.e., N>>6. Additionally, in the presence of noise, the matrix product Md will not be exactly zero. In these cases, the unknown parameters d can be solved by a constrained minimization of a norm of Md:

$$\tilde{d} = \arg\min \|Md\|, \quad \text{(Eq. 6)}$$

where "$\|\cdot\|$" is a suitable norm, e.g., the $L_2$ norm, and the operator "argmin" stands for "argument of the minimizer". Since the minimization problem as stated in Eq 6 has a trivial solution of d=0, the minimization problem can be solved under some constraints. As discussed in J. M. Varah, Least Squares Data Fitting with Implicit Functions, BIT, 36, pp. 842-854 (1996), these constraints may include Singular value constraint, where energy of d is constrained to be 1;
Linear constraint, where the product of d and a vector v is constrained to be 1;
Quadratic constraint, where the norm of the product Sd is 1 for some matrix S.

It is to be noted that this way of fitting an ellipse to the data is known as the algebraic method. There exist alternative ways of fitting an ellipse to the data, such as the geometric method, the total least squares method and non-linear optimization method. More information on these alternative methods can be found in the references below:

I. D. Coope, *Circle Fitting by Linear and Nonlinear Least Squares*, J Optim Theory Appl, 76, pp. 381-388 (1993).
W. Gander, G. H. Golub, and R. Strebel, *Least-Squares Fitting of Circles and Ellipses*, BIT, 34, pp. 558-578 (1994).
J. M. Varah, *Least Squares Data Fitting with Implicit Functions*, BIT, 36, pp. 842-854 (1996).

Figure 8A:
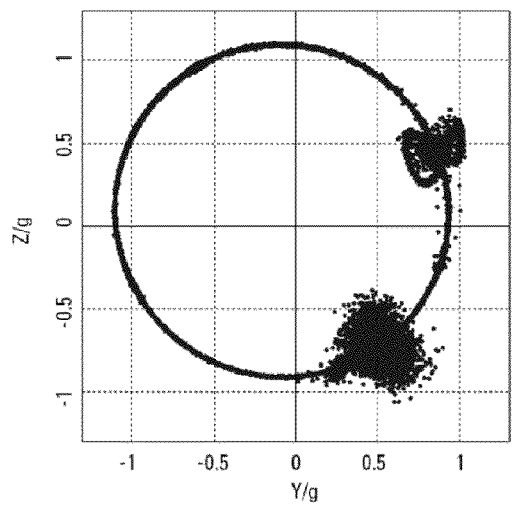
FIGS. 8A-8D are scatter plots to illustrate an alternative technique of determining calibration parameters, according to another embodiment.
Figure 8B:
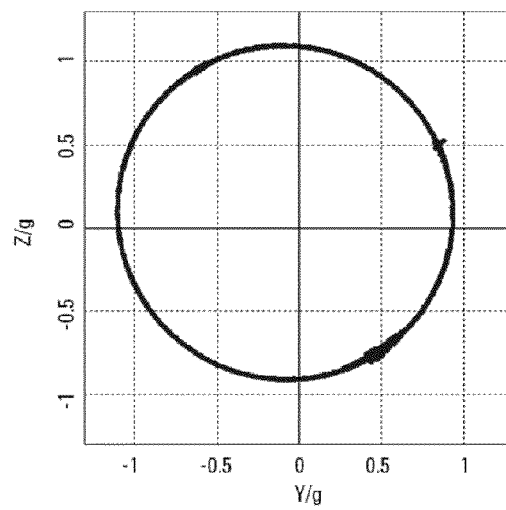
Figure 8C:
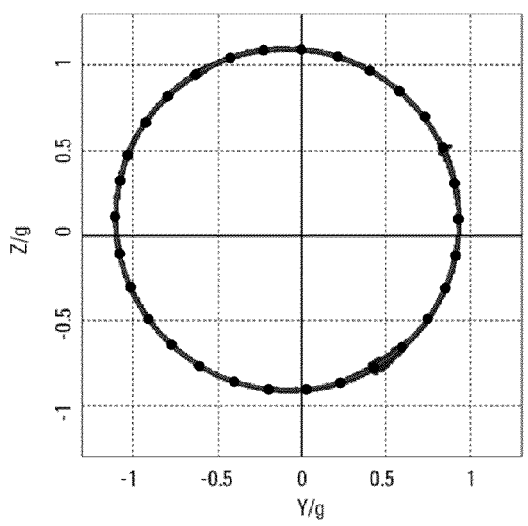
Figure 8D:
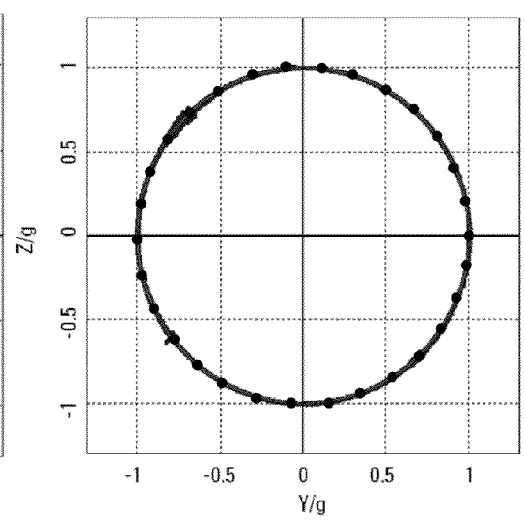

As an illustration, FIGS. 8A-8D show Y-versus-Z scatter plots for two co-located and orthogonally mounted particle motion sensors as a function of time. The figures show both the raw and high cut filtered Y and Z recordings. The low-high cut filter was used to remove the noise from the DC signal. To improve accuracy of the calibration method, the outliers that are noisy are muted. FIG. 8C shows an ellipse fitted to the filtered data (represented as dots). FIG. 8D shows the scatter plot of filtered data after removal of the DC biases and correction of the sensor sensitivities. As expected, after the calibration correction, the center of the circle coincides with the center of the coordinate system, and the maximum and minimum of the DC signal for both components of the particle motion sensors becomes +g and −g.

The accuracy of the described method will improve especially when long records of the DC measurement are available at various streamer orientations. In this respect, the steering of the cable to either side in the cross line directions and some measurements acquired during straight tow with little steering will provide sufficient data. It is also to be noted that, this type of a calibration can be performed once before start of the acquisition and if desired, the estimated calibration values can be continuously improved by using the measurements during seismic acquisition.

Figure 6:
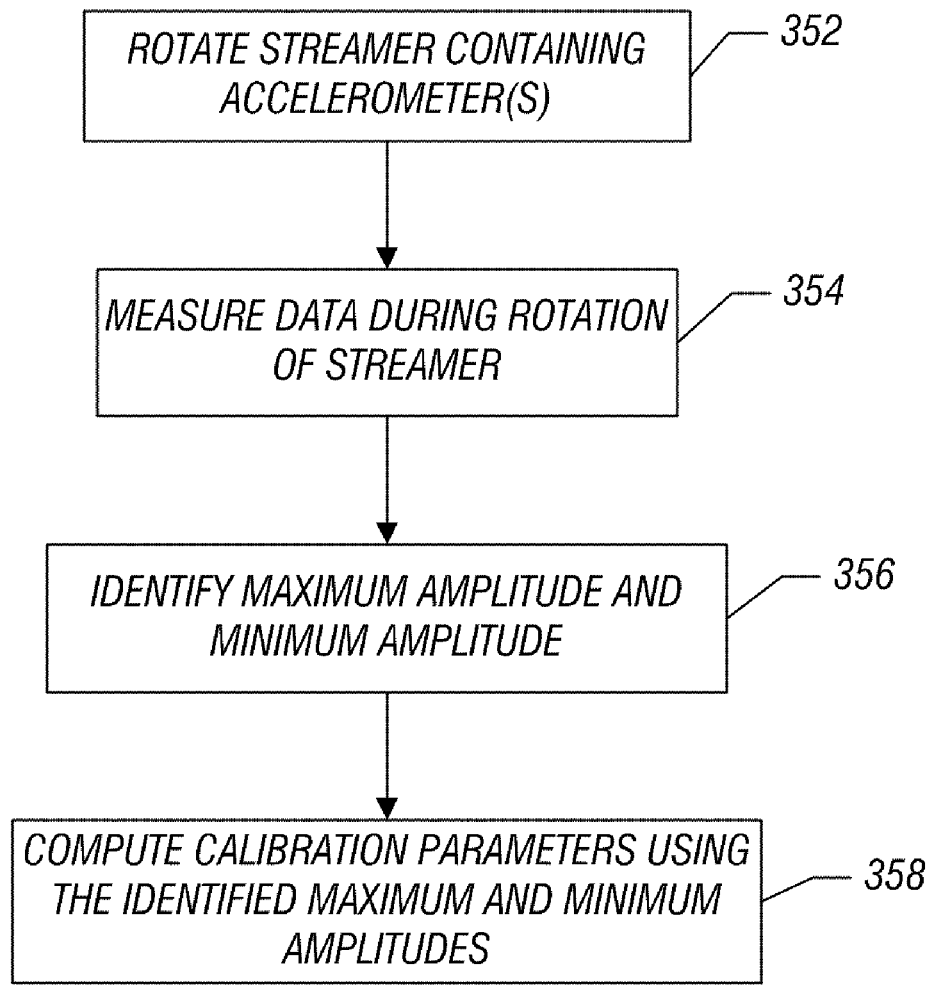
FIG. 6 is a flow diagram of a process of determining calibration parameters for an accelerometer, according to an embodiment.

FIG. 6 is a flow diagram of a process of determining calibration parameters of an accelerometer according to an embodiment. A streamer containing an accelerometer (or plural accelerometers) is rotated (at 352). Signals are measured (at 354) by the accelerometer during rotation of the streamer. Optionally, the measured signals can be adjusted to correct for any incline of the streamer (or streamer portion) with respect to the x axis. The maximum amplitude and minimum amplitude of the signals measured by the accelerometer are identified (at 356). From the maximum and minimum amplitudes, calibration parameters can be computed (at 358) using Eqs. 1 and 2, for example. The calibration parameters can then be applied to perform calibration of the accelerometer.

In some implementations, moving coil geophones can be used that do not measure gravity field. In such applications, inclinometers may be used in addition to the moving coil geophones to measure the orientation of the moving coil geophones to enable a processing system to rotate the data of the moving coil geophones in vertical and horizontal components. The inclinometers can be accelerometers that measure gravity, but which are not sensitive enough to be used to measure seismic signals. The calibration technique discussed above can also be applied to such inclinometers.

Figure 7:
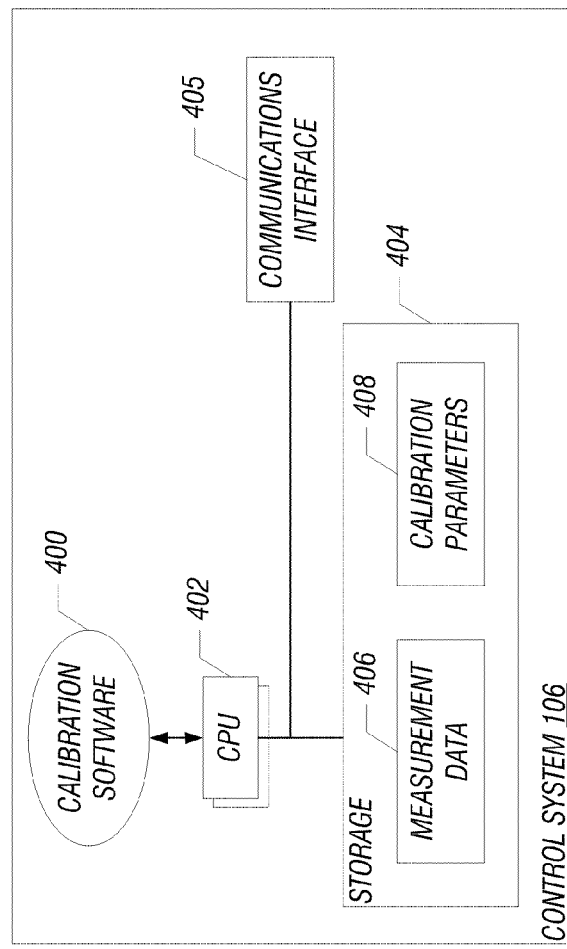
FIG. 7 is a block diagram of a computer that includes calibration software to perform tasks according to some embodiments.

The process of FIG. 6 can be performed by the control system 106 depicted in FIG. 7. The control system 106 includes calibration software 400 that is executable on one or more central processing units (CPUs) 402. The calibration software 400 is able to receive measurement data from an accelerometer, where the measurement data is measurement data corresponding to recorded data when a streamer containing the accelerometer is being rotated. Based on the received data, tasks 356 and 358 according to FIG. 6 can be performed.

The CPU(s) 402 is (are) connected to a storage 404 and a communications interface 405 to communicate to a remote network. The storage 404 contains measurement data 406 (which includes data from various sensors of the streamer) as well as calibration parameters 408 calculated by the calibration software 400. The calibration parameters 408 can be communicated through the communications interface 405 to a remote device, such as over a data network.

Instructions of the calibration software 400 are loaded for execution on a processor (such as the one or more CPUs 402). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of calibrating an accelerometer, comprising:
rotating a seismic cable that carries the accelerometer;
receiving measurement data measured by the accelerometer as the seismic cable is rotated;
identifying a first amplitude and a second amplitude in the received measurement data, wherein the first amplitude corresponds to a first gravity value, and the second amplitude corresponds to a second gravity value; and
computing at least one calibration parameter according to the identified first amplitude and second amplitude, the at least one calibration parameter for use in calibrating the accelerometer.

2. The method of claim 1, wherein rotating the seismic cable comprises rotating a streamer that carries seismic sensors, wherein the accelerometer is one of the seismic sensors.

3. The method of claim 2, wherein rotating the streamer further comprises rotating the streamer that further carries one or more hydrophones.

4. The method of claim 1, wherein the seismic cable further comprises a second accelerometer, the method further comprising:
receiving second measurement data measured by the second accelerometer as the seismic cable is rotated; and
computing another at least one calibration parameter according to the received second measurement data, the another at least one calibration parameter for use in calibrating the second accelerometer.

5. The method of claim 1, wherein the first amplitude is a maximum amplitude and the second amplitude is a minimum amplitude in the received measurement data, wherein the maximum amplitude corresponds to +1 g, and the minimum amplitude corresponds to −1 g,
wherein computing the at least one calibration parameter is according to the identified maximum amplitude and minimum amplitude.

6. The method of claim 5, further comprising determining an inclination of the seismic cable along its length with respect to a horizontal axis, the method further comprising adjusting the maximum amplitude and minimum amplitude according to the determined inclination.

7. The method of claim 6, wherein determining the inclination of the seismic cable is based on data of an inclinometer provided on the seismic cable.

8. The method of claim 7, wherein the inclinometer comprises a second accelerometer, the method further comprising:
receiving second measurement data measured by the inclinometer as the seismic cable is rotated; and
computing another at least one calibration parameter according to the received second measurement data, the another at least one calibration parameter for use in calibrating the inclinometer.

9. A method of calibrating an accelerometer, comprising:
rotating a seismic cable that carries the accelerometer;
receiving measurement data measured by the accelerometer as the seismic cable is rotated; and
computing at least one calibration parameter according to the received measurement data, the at least one calibration parameter for use in calibrating the accelerometer, wherein computing the at least one calibration parameter according to the received measurement data comprises fitting an ellipse onto the measurement data.

10. The method of claim 9, wherein fitting the ellipse onto the measurement data comprises calculating parameters for the ellipse that are used to calculate the at least one calibration parameter.

11. The method of claim 10, wherein calculating the parameters of the ellipse comprises calculating the parameters that describe a DC portion of the measurement data.

12. A method of calibrating an accelerometer, comprising:
rotating a seismic cable that carries the accelerometer, wherein rotating the seismic cable comprises rotating the seismic cable 360° multiple times;
receiving measurement data measured by the accelerometer as the seismic cable is rotated, wherein receiving the measurement data measured by the accelerometer comprises receiving plural sets of measurement data corresponding to the multiple 360° rotations;
averaging the multiple sets of measurement data to provide an average measured data; and
computing at least one calibration parameter according to the average measured data, wherein the at least one calibration parameter is for use in calibrating the accelerometer.

13. A method of calibrating an accelerometer, comprising:
rotating a seismic cable that carries the accelerometer;
receiving measurement data measured by the accelerometer as the seismic cable is rotated; and
computing at least one calibration parameter according to the received measurement data, the at least one calibration parameter for use in calibratin the accelerometer, wherein computing the at least one calibration parameter comprises computing a sensitivity of the accelerometer.

14. The method of claim 13, further comprising calibrating the accelerometer using the at least one calibration parameter.

15. The method of claim 13, wherein rotating the seismic cable comprises rotating the seismic cable with at least one steering device in the seismic cable.

16. The method of claim 13, wherein rotating the seismic cable comprises rotating the seismic cable as a result of the seismic cable being towed in a body of water.

17. The method of claim 13, wherein rotating the seismic cable comprises rotating the seismic cable on a reel.

18. The method of claim 13, wherein computing the at least one calibration parameter further comprises computing an offset of the accelerometer.

19. The method of claim 13, wherein the sensitivity of the accelerometer indicates a volts-per-g sensitivity of the accelerometer.

20. The method of claim 18, wherein the offset of the accelerometer represents a DC offset of the accelerometer.

* * * * *